United States Patent
Mase et al.

(10) Patent No.: US 9,302,599 B2
(45) Date of Patent: Apr. 5, 2016

(54) SEAT RECLINING APPARATUS FOR VEHICLE SEAT

(71) Applicant: FUJI KIKO CO., LTD., Kosai-shi, Shizuoka (JP)

(72) Inventors: Fumisato Mase, Kosai (JP); Toshihiro Hikosaka, Kosai (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 14/419,826

(22) PCT Filed: Sep. 24, 2013

(86) PCT No.: PCT/JP2013/005631
§ 371 (c)(1),
(2) Date: Feb. 5, 2015

(87) PCT Pub. No.: WO2014/050076
PCT Pub. Date: Apr. 3, 2014

(65) Prior Publication Data
US 2015/0224898 A1 Aug. 13, 2015

(30) Foreign Application Priority Data
Sep. 27, 2012 (JP) ................. 2012-213465

(51) Int. Cl.
*B60N 2/235* (2006.01)
(52) U.S. Cl.
CPC ............ *B60N 2/2356* (2013.01); *B60N 2/2358* (2013.01)
(58) Field of Classification Search
CPC ............................. B60N 2/2358; B60N 2/2356
USPC ...................................... 297/367 P
See application file for complete search history.

(56) References Cited

U.S. PATENT DOCUMENTS

| 4,143,905 A | 3/1979 | Hensel et al. | |
| 5,779,313 A | 7/1998 | Rohee | |
| 6,102,480 A * | 8/2000 | Asano | B60N 2/2356 297/366 |
| 6,312,053 B1 | 11/2001 | Magyar | |
| 6,390,557 B1 * | 5/2002 | Asano | B60N 2/2356 297/367 R |
| 7,552,971 B1 * | 6/2009 | Tarusawa | B60N 2/2356 297/367 P |
| 7,802,849 B2 * | 9/2010 | Tarusawa | B60N 2/2356 297/367 P |
| 7,828,386 B2 * | 11/2010 | Reubeuze | B60N 2/2358 297/367 P |
| 7,963,607 B2 * | 6/2011 | Heo | B60N 2/2356 297/367 P |

(Continued)

FOREIGN PATENT DOCUMENTS

| EP | 0 770 514 A1 | 5/1997 |
| EP | 2 447 111 A2 | 5/2012 |

(Continued)

*Primary Examiner* — Rodney B White
(74) *Attorney, Agent, or Firm* — Foley & Lardner LLP

(57) ABSTRACT

A seat reclining apparatus including a base member, a rotatable cover member with an internal tooth gear, three tooth plates with external tooth gears, a pivotable cam member on an inner peripheral side of the tooth plates, a biasing member biasing each of the tooth plates, three guide projections projecting from the tooth plates toward the cover member, an annular grooved portion in the cover member, and three guide surfaces whose one or two being formed on an inner peripheral wall surface of the annular grooved portion, the remainder of the three guide surfaces being formed on the outer peripheral wall surface thereof, wherein the three guide surfaces serve to restrain displacement of the three tooth plates toward the lock position when the respective guide projections are allowed to run upon the corresponding guide surfaces.

5 Claims, 11 Drawing Sheets

(56) References Cited

U.S. PATENT DOCUMENTS

| | | | | |
|---|---|---|---|---|
| 8,256,843 B2* | 9/2012 | Iguchi | B60N 2/2356 297/367 P X |
| 8,414,077 B2* | 4/2013 | Reubeuze | B60N 2/2356 297/367 P X |
| 8,430,453 B2* | 4/2013 | Fujishiro | B60N 2/2356 297/367 P |
| 8,651,578 B2* | 2/2014 | Yamada | B60N 2/2356 297/367 P |
| 8,882,199 B2* | 11/2014 | Yamada | B60N 2/2356 297/367 P |
| 8,926,018 B2* | 1/2015 | Ito | B60N 2/2356 297/367 P X |
| 8,955,910 B2* | 2/2015 | Line | B60N 2/2245 297/367 P X |
| 8,955,911 B2* | 2/2015 | Yamada | B60N 2/2356 297/367 P X |
| 8,985,690 B2* | 3/2015 | Yamada | B60N 2/2358 297/367 L X |
| 2002/0043852 A1* | 4/2002 | Uramichi | B60N 2/2356 297/366 |
| 2003/0230923 A1* | 12/2003 | Uramichi | B60N 2/2356 297/367 R |
| 2007/0132294 A1* | 6/2007 | Yamada | B60N 2/2356 297/367 R |
| 2009/0243360 A1* | 10/2009 | Tarusawa | B60N 2/2356 297/362 |
| 2009/0243361 A1* | 10/2009 | Tarusawa | B60N 2/2356 297/362 |
| 2009/0243363 A1* | 10/2009 | Tarusawa | B60N 2/2356 297/367 P |
| 2010/0033004 A1* | 2/2010 | Reubeuze | B60N 2/2356 297/367 P |
| 2010/0109408 A1* | 5/2010 | Ohba | B60N 2/2356 297/367 P |
| 2010/0194164 A1* | 8/2010 | Cha | B60N 2/2356 297/362 |
| 2010/0194165 A1* | 8/2010 | Iguchi | B60N 2/2356 297/367 P |
| 2011/0025114 A1* | 2/2011 | Berndtson | B60N 2/206 297/367 P |
| 2011/0057494 A1* | 3/2011 | Reubeuze | B60N 2/2356 297/367 P |
| 2011/0101754 A1* | 5/2011 | Suzuki | B60N 2/2356 297/354.12 |
| 2011/0115271 A1* | 5/2011 | Yamada | B60N 2/2356 297/367 P |
| 2011/0181088 A1* | 7/2011 | Zhang | B60N 2/2356 297/367 P |
| 2012/0098314 A1 | 4/2012 | Kuno | |
| 2012/0139319 A1* | 6/2012 | Fujishiro | B60N 2/682 297/366 |
| 2012/0217782 A1* | 8/2012 | Yamada | B60N 2/2356 297/367 R |
| 2013/0161995 A1* | 6/2013 | Yamada | B60N 2/12 297/367 P |
| 2014/0103693 A1* | 4/2014 | Yamada | B60N 2/2356 297/354.12 |
| 2014/0125105 A1* | 5/2014 | Yamada | B60N 2/235 297/354.12 |

FOREIGN PATENT DOCUMENTS

| | | |
|---|---|---|
| FR | 2 364 784 A1 | 4/1978 |
| JP | 2012-91624 A | 5/2012 |

* cited by examiner

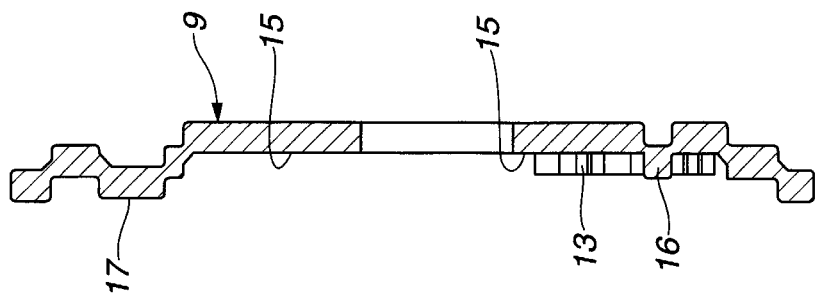
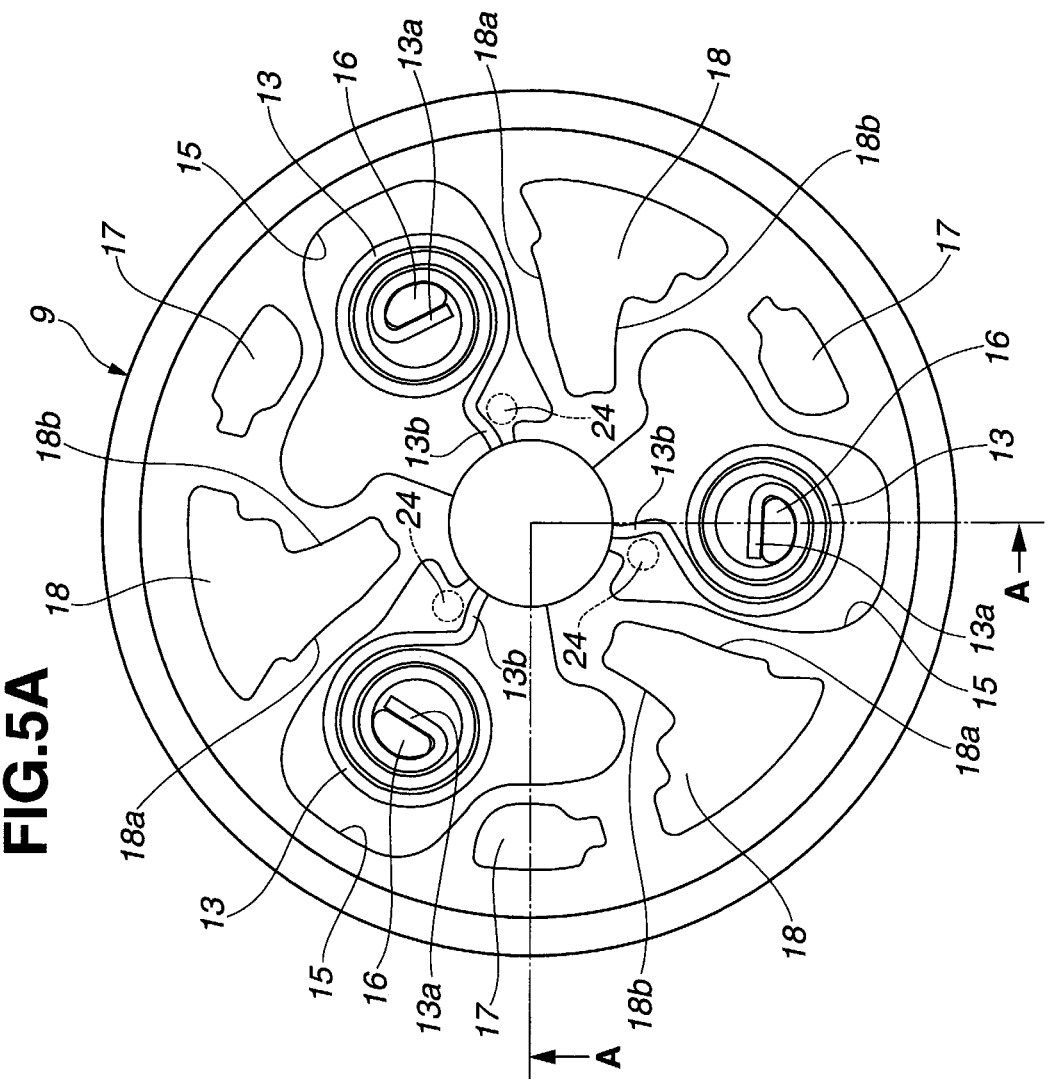

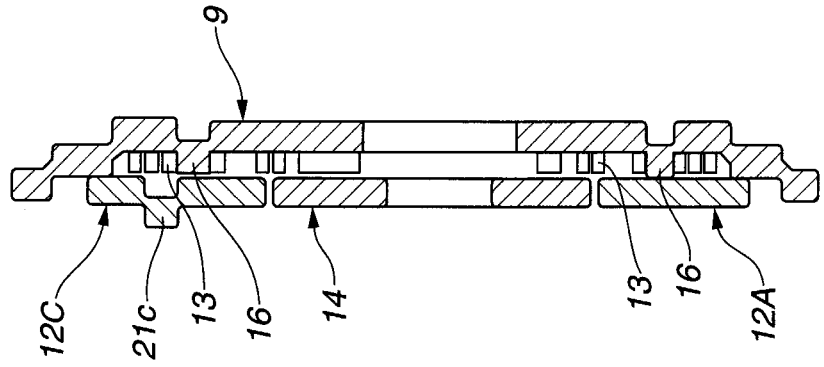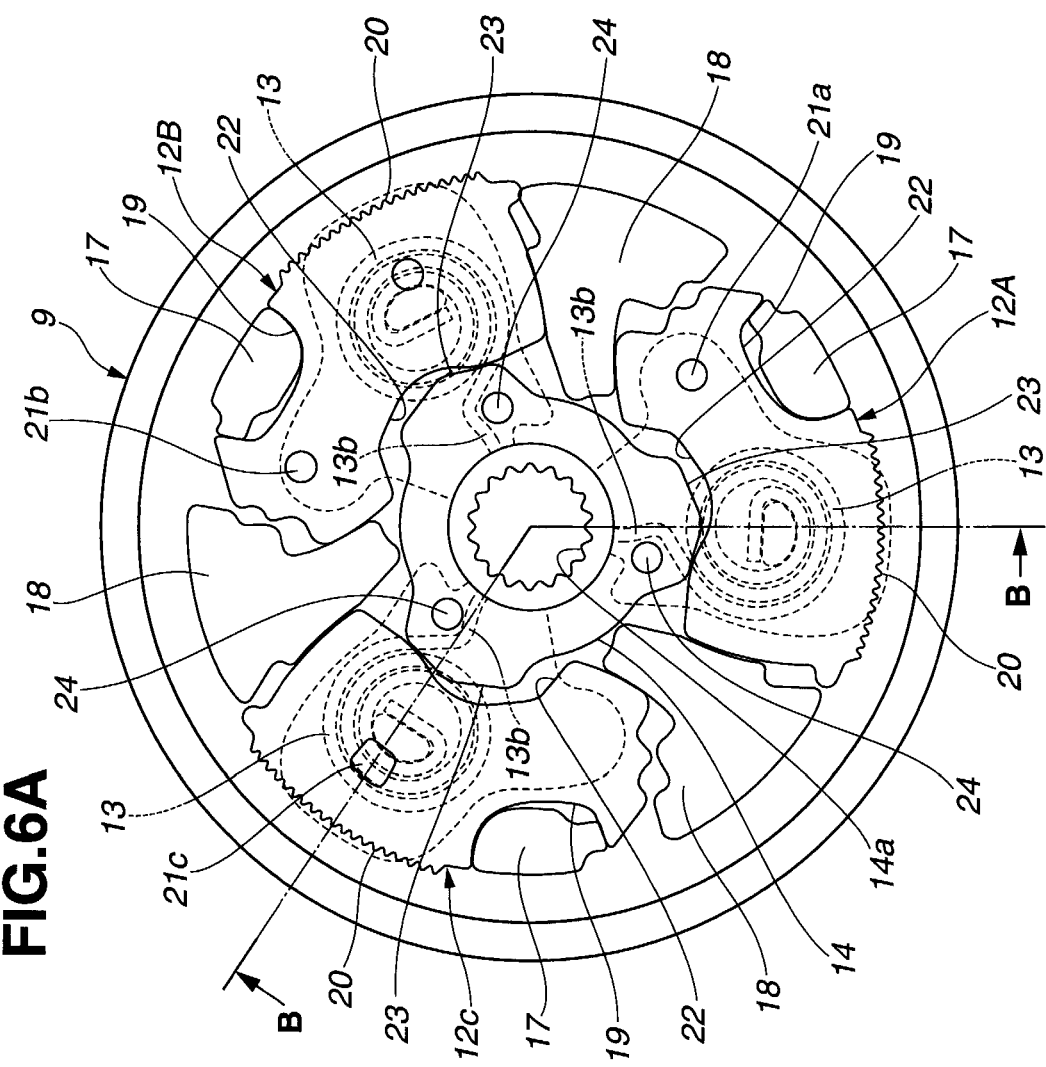

SEAT RECLINING APPARATUS FOR VEHICLE SEAT

TECHNICAL FIELD

The present invention relates to an improved seat reclining apparatus for a vehicle seat.

BACKGROUND ART

As generally known, a seat reclining apparatus for a vehicle seat that includes a seat cushion and a seat back inclinable relative to the seat cushion, has an operation range of the seat back. The operation range includes a reclining range in which the seat back can be stepwise inclined and locked in an inclining position, and a so-called free range in which the seat back is inclinable and free from being locked. In a typical seat reclining apparatus, the reclining range is defined between a substantially upright position and a rearwardmost inclining position (so-called full-flat position), and the free range is defined between the substantially upright position and a forwardmost inclining position, so that the operation range defined between the forwardmost inclining position and the rearwardmost inclining position is set as a sum of the reclining range and the free range which is substantially 180 degrees.

There have been provided various kinds of structures for a so-called recliner formed with a generally disk-shaped unit of an articulated portion or a hinged portion through which the seat cushion and the seat back are connected with each other to thereby serve adjustment of an inclining position of the seat back relative to the seat cushion. For instance, Patent Literature 1 discloses a seat reclining apparatus with a recliner that includes a base member, a cover member facing the base member, and three tooth plates disposed therebetween. In a reclining range of the seat reclining apparatus, the tooth plates are positively disengaged from and engaged with an internal tooth gear of the cover member, thereby changing an inclining position (attitude) of the seat back relative to the seat cushion and locking the seat back in the inclining position. On the other hand, in a free range of the seat reclining apparatus, the respective tooth plates is restrained to be in an unlock state in which the tooth plates are kept disengaged from the internal tooth gear of the cover member, thereby changing the inclining position of the seat back without being locked in the inclining position. Further, arcuate guide portions are formed on both the internal tooth gear and the cover member so as to restrain movement of the respective tooth plates in the free range.

In such a recliner of the above conventional art, as the number of tooth plates are increased, it becomes important to avoid overlap of the reclining range and the free range. In order to avoid the overlap, in the seat reclining apparatus of the above conventional art, the guide portions are changed in position (thickness) from each other in an axial direction of the cover member.

CITATION LIST

Patent Literature

Patent Literature 1: Japanese Patent Application Unexamined Publication No. 2012-91624

SUMMARY OF INVENTION

Technical Problem

However, in a case where the guide portions of the recliner are changed in position (thickness) from each other in an axial direction of the cover member as described in the above conventional art, the thickness of the cover member in the axial direction must be inevitably increased. Therefore, there is a limitation to reduction in size and weight of the seat reclining apparatus by slimming down the recliner. Thus, the seat reclining apparatus still has plenty of room for improvement.

The present invention has been made in view of the above-described problems. An object of the present invention is to provide a seat reclining apparatus for a vehicle seat which is reduced in size and weight as a whole by slimming a recliner with reducing a thickness of a cover member.

Solution to Problem

In a first aspect of the present invention, there is provided a seat reclining apparatus for a vehicle seat, the vehicle seat including a seat cushion and a seat back, the seat reclining apparatus including:

a base member fixed to one of a lower bracket on a side of the seat cushion and an upper bracket on a side of the seat back;

a cover member fixed to the other of the lower bracket and the upper bracket, the cover member being overlapped with the base member and rotatable relative to the base member;

an internal tooth gear formed in an inner periphery of the cover member;

three tooth plates disposed between the base member and the cover member along a circumferential direction of the base member and the cover member, the three tooth plates having external tooth gears which are displaceable in a radial direction of the internal tooth gear and meshable with the internal tooth gear, respectively;

a cam member pivotably disposed on an inner peripheral side of the three tooth plates, the cam member serving to displace the three tooth plates between a lock position in which the internal tooth gear and the external tooth gears are meshingly engaged with each other and an unlock position in which the internal tooth gear and the external tooth gears are disengaged from each other;

a biasing member biasing each of the three tooth plates in a lock direction in which the internal tooth gear and the external tooth gears come into meshing engagement; three guide projections formed on the three tooth plates, respectively, the three guide projections projecting toward the cover member;

an annular grooved portion formed in a surface of the cover member which faces the base member in a concentric relation to the internal tooth gear, the annular grooved portion being recessed in an axial direction of the cover member; and three guide surfaces formed on the annular grooved portion corresponding to the respective three guide projections that project into the annular grooved portion, one or two of the three guide surfaces being formed on an inner peripheral wall surface of the annular grooved portion, the remainder of the three guide surfaces being formed on the outer peripheral wall surface of the annular grooved portion, wherein the three guide surfaces serve to restrain displacement of the three tooth plates toward the lock position when the respective three guide projections are allowed to run upon the corresponding guide surfaces.

In a second aspect of the present invention, there is provided the seat reclining apparatus for a vehicle seat, according to the first aspect as described above, wherein the three guide surfaces are a first guide surface formed on the inner peripheral wall surface of the annular grooved portion, a second guide surface formed on the inner peripheral wall surface of the annular grooved portion, and a third guide surface formed on the outer peripheral wall surface of the annular grooved portion, the first and second guide surfaces projecting in a radially outward direction of the annular grooved portion, the third guide surface projecting in a radially inward direction of the annular grooved portion, and wherein the inner peripheral wall surface of the annular grooved portion further includes a basic inner peripheral surface, the first guide surface having an arcuate shape having a diameter larger than that of the basic inner peripheral surface, the second guide surface having an arcuate shape having a diameter larger than that of the first guide surface, the first guide surface and the second guide surface being connected with each other in series in the circumferential direction of the annular grooved portion.

In a third aspect of the present invention, there is provided the seat reclining apparatus for a vehicle seat, according to the second aspect as described above, wherein the outer peripheral wall surface of the annular grooved portion further comprises a basic outer peripheral surface, the basic outer peripheral surface comprising a plurality of concave portions formed at intervals in the circumferential direction of the annular grooved portion, wherein the cover member comprises a bulged portion formed on a side of the cover member which is located an opposite side of the base member, the bulged portion having an outer peripheral surface with concave and convex portions corresponding to the third guide surface and basic outer peripheral surface with the plurality of concave portions of the annular grooved portion, wherein the bulged portion is fitted to a mount hole formed in the lower bracket or the upper bracket.

Advantageous Effects of Invention

In the seat reclining apparatus according to the first and second aspects as described above, the inner and outer peripheral wall surfaces of the annular grooved portion are formed with the three guide surfaces in total. With this arrangement, it is not necessary to locate the three guide surfaces in positions different from each other in the axial direction of the cover member as described in the above conventional art, and therefore, the three guide surfaces can be located in alignment with each other in the axial direction of the cover member. As a result, the cover member can be slimmed down with a reduced thickness, thereby serving to reduce size and weight of the whole seat reclining apparatus.

Further, in the seat reclining apparatus according to the third aspect as described above, it is not necessary to form a step or the like only for connecting the cover member with the lower bracket on the side of the seat cushion or the upper bracket on the side of the seat back. Therefore, the thickness of the cover member can be further reduced. In addition, it is possible to enhance a rigidity of a seat cushion frame or a seat back frame to which the lower bracket or the upper bracket is mounted.

BRIEF DESCRIPTION OF DRAWINGS

FIG. 5A is a front view of the recliner as shown in FIG. 4, showing a relative position of a base plate and spiral springs.

FIG. 5B is a sectional view, taken along line A-A as shown in FIG. 5A.

FIG. 6A is a front view of the recliner as shown in FIG. 4, showing a relative position of a base plate and spiral springs and a relative position of tooth plates and a cam.

FIG. 6B is a sectional view, taken along line B-B as shown in FIG. 6A.

DESCRIPTION OF EMBODIMENTS

Figure 1:
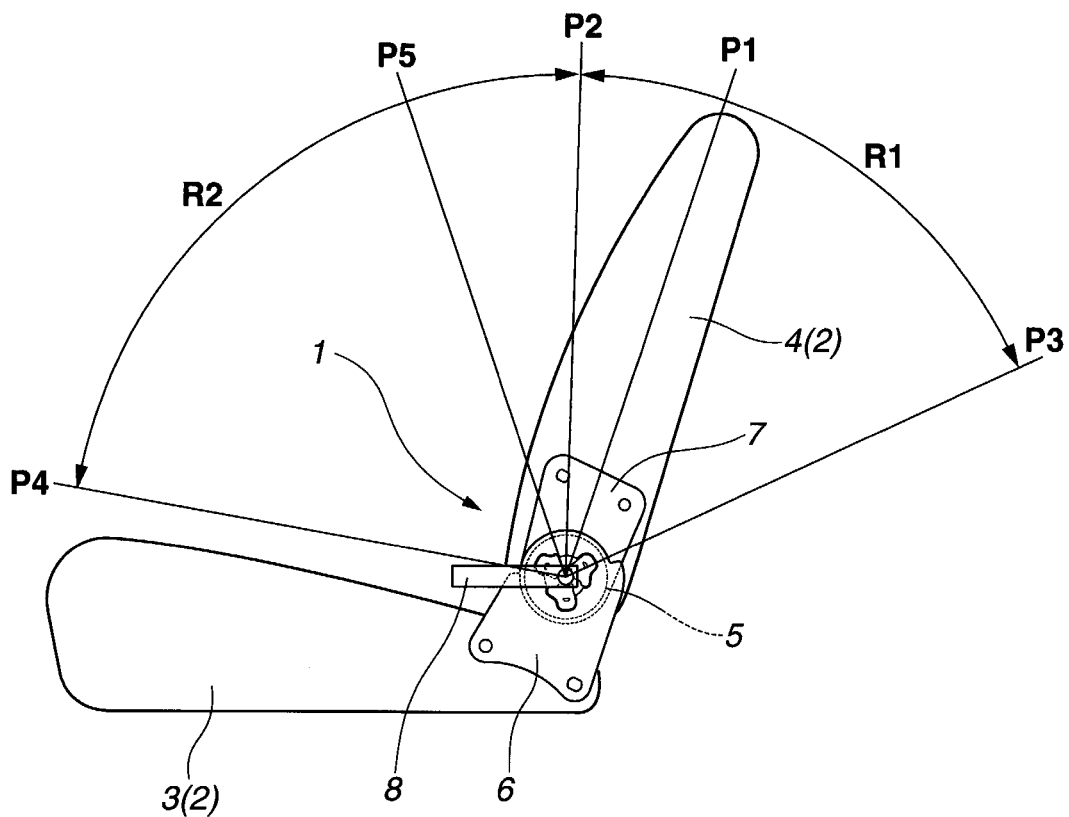
FIG. 1 is a schematic side view of a seat reclining apparatus for a vehicle seat, according to an embodiment of the present invention.
Figure 2:
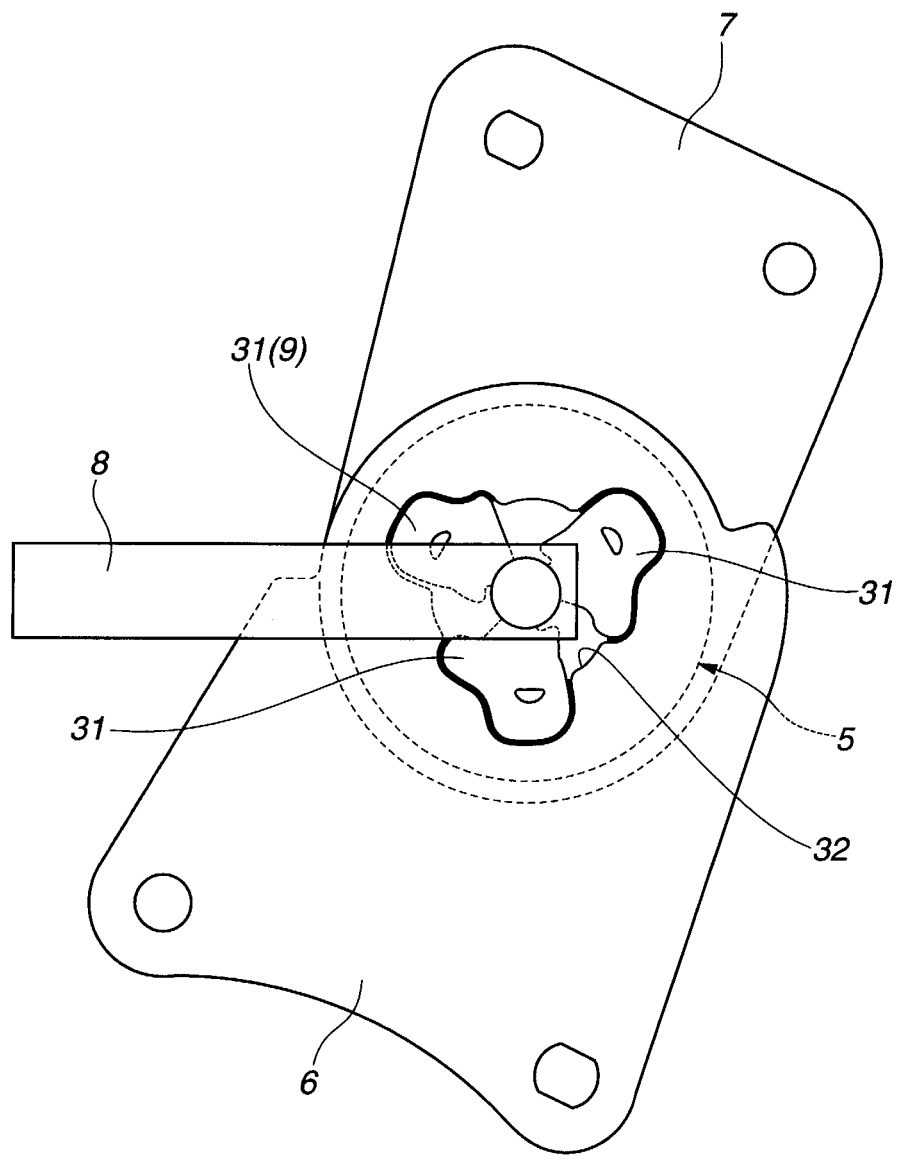
FIG. 2 is an enlarged explanatory diagram showing an essential part of the seat reclining apparatus shown in FIG. 1.
Figure 3:
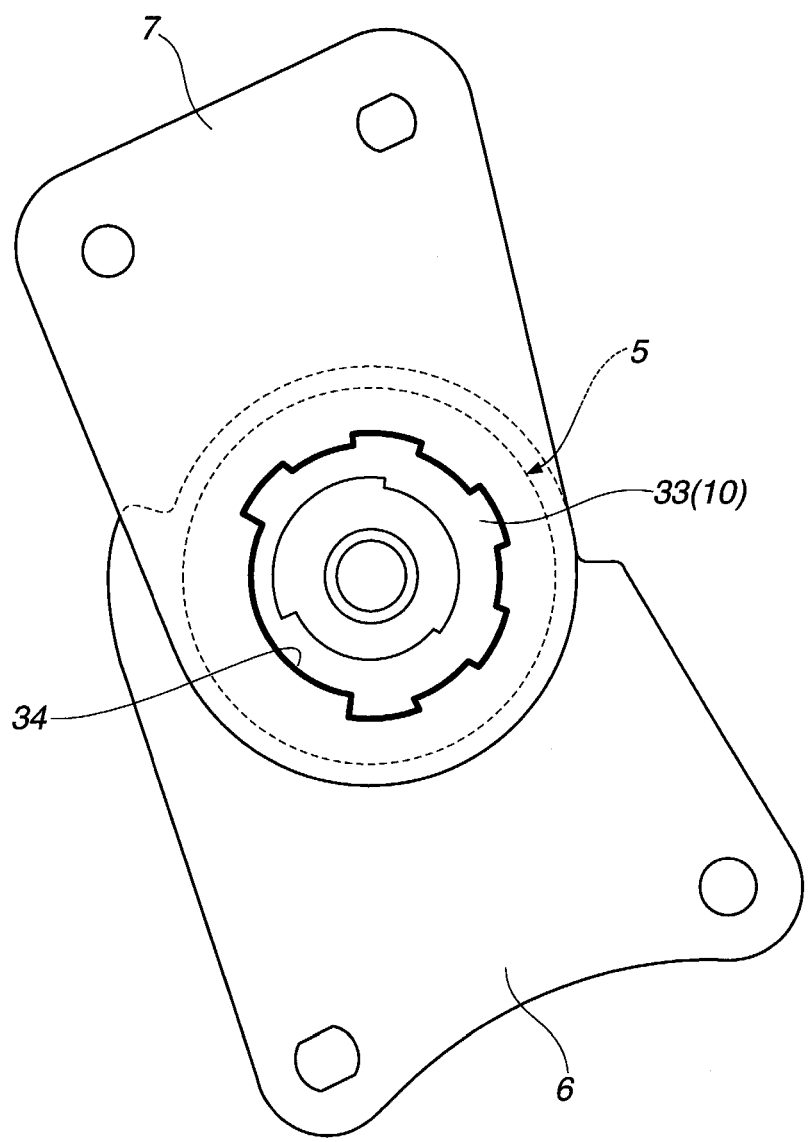
FIG. 3 is a schematic back view of the essential part of the seat reclining apparatus as shown in FIG. 2.
Figure 4:
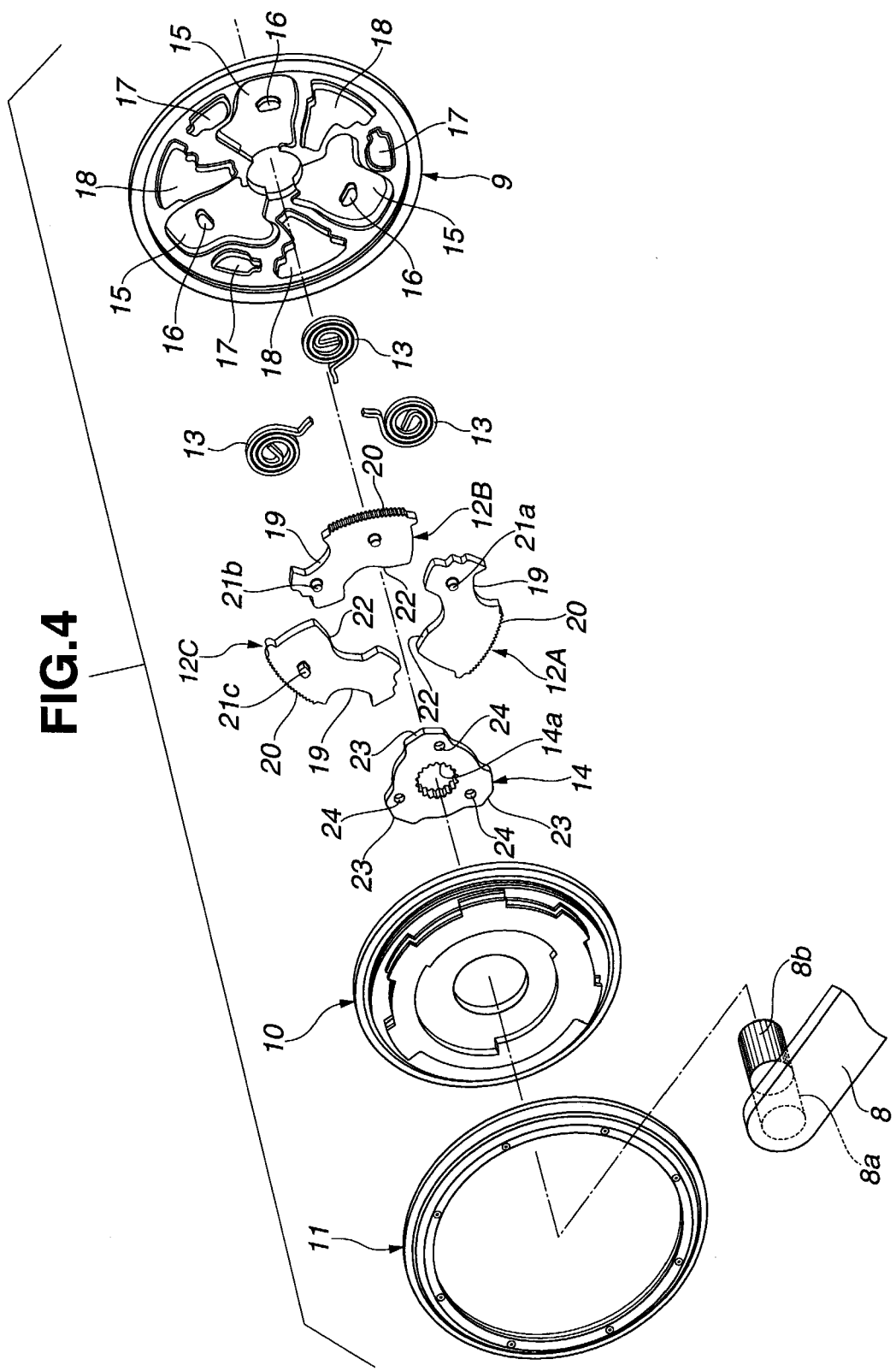
FIG. 4 is an exploded perspective view showing only a recliner of the seat reclining apparatus as shown in FIG. 1.

In the following, a seat reclining apparatus for a vehicle seat, according to an embodiment of the present invention will be explained in detail with reference to FIG. 1 to FIG. 11. FIG. 1 is a schematic side view of the whole seat reclining apparatus. FIG. 2 is an enlarged diagram showing an essential part of the seat reclining apparatus. FIG. 3 is a back view of the essential part of the seat reclining apparatus as shown in FIG. 2. FIG. 4 is an exploded perspective view of a recliner as a main part of the seat reclining apparatus as shown in FIGS. 2 and 3.

As shown in FIG. 1, a seat reclining apparatus 1 is mounted to a vehicular seat 2 constituted of a seat cushion 3 and a seat back 4 inclinable relative to the seat cushion 3. The seat reclining apparatus 1 includes a recliner 5 as a main part thereof which is provided in order to adjust an attitude of the seat back 4. The recliner 5 is disposed in a connecting portion in which the seat cushion 3 and the seat back 4 are connected with each other. The recliner 5 has a generally flat disk shape, and serves as an articulation or a hinge through which a reclining function of the seat back 4 can be performed.

Specifically, as shown in FIG. 1 to FIG. 3, a lower bracket 6 is disposed on a side of the seat cushion 3, and an upper bracket 7 is disposed on a side of the seat back 4. The lower bracket 6 is fixed to a seat cushion frame (not shown) as a skeleton of the seat cushion 3, and the upper bracket 7 is fixed to a seat back frame (not shown) as a skeleton of the seat back 4. A generally flat disk-shaped recliner 5 is disposed in a connecting portion in which the lower bracket 6 and the upper bracket 7 are connected with each other. The recliner 5 is previously formed as an integral unit. An operating lever 8 is projected from the recliner 5, through which a reclining operation of the seat reclining apparatus 1 is carried out. The seat back 4 is always urged to pivotally move about the recliner 5 toward a forward inclining position by a biasing force of a spring member (not shown).

As shown in FIG. 1, a standard position of the seat back 4 in which the seat back 4 is in a rearward inclining attitude is determined as a neutral position P1 as a reference position in view of design. Further, as shown in FIG. 1, a slightly forward-inclining position relative to the neutral position P1 in which the seat back 4 is in a substantially upright attitude is determined as an initial stage lock position P2. In this condition, in a range from the initial stage lock position P2 to a rearwardmost inclining position (a so-called full flat position) P3 of the seat back 4, a rearward inclining attitude of the seat back 4 can be optionally adjusted, and the seat back 4 can be locked in an optional rearward inclining position. The range from the initial stage lock position P2 to the rearwardmost inclining position P3 is determined as a reclining range R1. Further, in a range from the initial stage lock position P2 to a forwardmost inclining position P4 of the seat back 4, the seat back 4 can be freely pivotally moved about the recliner 5 and forward and rearward inclined. The range from the initial stage lock position P2 to the forwardmost inclining position P4 is determined as a free range R2. Further, when the seat back 4 located in the free range R2 is rearward inclined, the seat back 4 is initially locked in the initial stage lock position P2 in which the seat back 4 is restrained in the substantially upright attitude.

As shown in FIG. 4, the recliner 5 includes a generally shallow disk-shaped base plate (base member) 9, a generally shallow disk-shaped cover plate (cover member) 10, a retaining ring 11, three tooth plates 12A, 12B, 12C, a generally triangular cam (cam member) 14 and three spiral springs (biasing members) 13. The cover plate 10 is overlapped with the base plate 9 so as to mate with the base plate 9 in a direction of a central axis of the base plate 9 (i.e., in a direction of a central axis of the recliner 5). The retaining ring 11 serves to retain the base plate 9 and the cover plate 10 such that the base plate 9 and the cover plate 10 can be rotated relative to each other about the central axis of the recliner 5. The tooth plates 12A, 12B, 12C are formed into a generally sector gear shape (so-called sector shape), and are disposed between the base plate 9 and the cover plate 10 along a circumferential direction of the base plate 9 and the cover plate 10. The cam 14 is disposed on an inner peripheral side of the tooth plates 12A, 12B, 12C. The spiral springs 13 bias the cam 14 such that the cam 14 presses the tooth plates 12A, 12B, 12C in a radially outward direction of the tooth plates 12A, 12B, 12C. The cam 14 is connected with a pivot 8a disposed on a side of the operating lever 8, through a serration as explained later.

FIGS. 5A and 5B are a front view of the base plate 9 with the spiral springs 13 as shown in FIG. 4 and a sectional view thereof, respectively, which show a relative position of the base plate 9 and the spiral springs 13. As shown in FIG. 4, FIG. 5A and FIG. 5B, the base plate 9 has a generally circular shallow dish shape having a central hole. The base plate 9 may be formed by subjecting a disk-shaped blank having a uniform thickness in a thickness direction thereof to high accuracy pressing. The base plate 9 includes three spring accommodating concave portions 15 each being recessed from an inner bottom surface of the base plate 9 so that a step is formed therebetween. Each of the spring accommodating concave portions 15 is located in three positions equidistantly spaced from each other in a circumferential direction of the base plate 9. A spring support projection 16 is protrudently formed on a substantially central portion of each of the spring accommodating concave portions 15 by so-called half blanking. The spiral spring 13 is accommodated in each of the spring accommodating concave portions 15 in such a state that an inner peripheral end 13a of the spiral spring 13 is engaged with the spring support projection 16.

The base plate 9 also includes three support projections 17 for supporting the tooth plates 12A-12C. Each of the support projections 17 is projected from the inner bottom surface of the base plate 9 in an opposite direction of each of the spring accommodating concave portions 15, i.e., toward a side of the cover plate 10. The support projection 17 is located in three positions equidistantly spaced from each other in the circumferential direction of the base plate 9 without interfering with the spring accommodating concave portion 15. Further, the base plate 9 includes three guide emboss portions 18 for guiding the tooth plates 12A-12C. Each of the guide emboss portions 18 is embossed to project from the inner bottom surface of the base plate 9 in the same direction as that of the support projection 17, i.e., toward the side of the cover plate 10. The guide emboss portion 18 is located in three positions equidistantly spaced from each other in the circumferential direction of the base plate 9 without interfering with the support projection 17 and the spring accommodating concave portion 15. That is, the spring accommodating concave portion 15, the support projection 17 and the guide emboss portion 18 are offset in angular phase from each other. FIGS. 6A and 6B are a front view of the recliner 5 and a sectional view thereof, respectively, which show the base plate 9 in which the spiral springs 13, the three tooth plates 12A-12C and the cam 14 are accommodated. As shown in FIG. 4 to FIG. 6B, the tooth plates 12A-12C are located in the same manner in the circumferential direction of the base plate 9 such that the tooth plates 12A-12C are respectively partially overlapped with the spiral springs 13 accommodated in the spring accommodating concave portions 15. At this time, a bearing concave portion (cutout bearing portion) 19 formed as a bearing portion in an outer periphery of each of the tooth plates 12A-12C is engaged with each of the support projections 17. Specifically, the support projection 17 has a generally cylindrical surface on both end portions thereof in the circumferential direction of the base plate 9. The bearing concave portion 19 also has a generally cylindrical surface on both end portions thereof in a circumferential direction of each of the tooth plates 12A-12C which is substantially conformed with the generally cylindrical surface of the support projection 17 such that the bearing concave portion 19 is engageable with the support projection 17. With the engagement of the bearing concave portion 19 with the support projection 17, each of the tooth plates 12A-12C can be pivotally moved about the support projection 17 as a fulcrum such that an external tooth gear 20 formed in each of the tooth plates 12A-12C as explained later is displaceable in a radial direction of the base plate 9.

Each of the sector-shaped tooth plates 12A-12C has the external tooth gear 20 and the bearing concave portion 19 on an outer peripheral surface thereof which are formed adjacent to each other in the circumferential direction of the tooth plate. In addition, as shown in FIG. 4, each of the sector-shaped tooth plates 12A, 12B, 12C has one of guide projections 21a, 21b, 21c on the surface that faces the cover plate 10. Specifically, a first guide projection 21a is formed on the tooth plate 12A, a second guide projection 21b is formed on the tooth plate 12B, and a third guide projection 21c is formed on the tooth plate 21c. The guide projections 21a, 21b, 21c are formed to project toward the cover plate 10 by so-called half blanking.

As shown in FIG. 4 and FIG. 6A, the cam 14 is disposed on the inner peripheral sides of the tooth plates 12A-12C such that the cam 14 is surrounded by the tooth plates 12A-12C. A cam surface 23 on a drive side is formed on each of three peaks of the cam 14, which has a predetermined profile. On the other hand, a cam surface 22 on a driven (follower) side is formed on an inner periphery of each of the tooth plates 12A-12C, which has a predetermined profile including a concave portion. The drive-side cam surface 23 of the cam 14 is received in the concave portion of the driven-side cam surface 22 of each of the tooth plates 12A-12C.

As shown in FIG. 4 and FIG. 6A, the cam 14 has a central hole and a female serration 14a on an inner peripheral surface that defines the central hole. The female serration 14a is meshable with a male serration 8b formed in an outer peripheral surface of the pivot 8a on the side of the operating lever 8 as shown in FIG. 1 and FIG. 4. The operating lever 8 is connected to the cam 14 through meshing engagement between the male serration 8b and the female serration 14a, so that the operating lever 8 and the came 14 can make a unitary rotation.

As shown in FIG. 4, FIG. 5A and FIG. 6A, the cam 14 has three spring bearing projections 24 on a surface of the cam 14 which faces the cover plate 10. The spring bearing projections 24 are located in three positions spaced from each other in a circumferential direction of the central hole of the cam 14, and formed to project toward the cover plate 10 by so-called half-blanking. Each of the spring bearing projections 24 retains an outer peripheral end portion 13b of each of the spiral springs 13. A spring force of each of the spiral springs 13 is exerted on the cam 14 in a clockwise direction when viewed in FIG. 4, FIG. 5A and FIG. 6A, so that the cam 14 is urged to press the respective tooth plates 12A-12C in a radially outward direction of the base plate 9.

As shown in FIG. 6A, each of the tooth plates 12A-12C is disposed between the guide emboss portions 18, 18 adjacent to each other in the circumferential direction of the base plate 9. Each of the tooth plates 12A-12C is supported on both sides thereof by each of the guide emboss portions 18, 18. That is, each of the tooth plates 12A-12C is supported by arcuate guide surfaces 18a, 18b on both sides of each of the guide emboss portions 18, 18 as shown in FIG. 5A. With the provision of the guide surfaces 18a, 18b, each of the tooth plates 12A-12C can be pivotally displaced. As a result, each of the tooth plates 12A-12C is pivotally moveable about the support projection 17 as a fulcrum, and is also guided by the guide emboss portions 18, 18. Thus, smooth movement of the tooth plates 12A-12C can be ensured.

Figure 7:
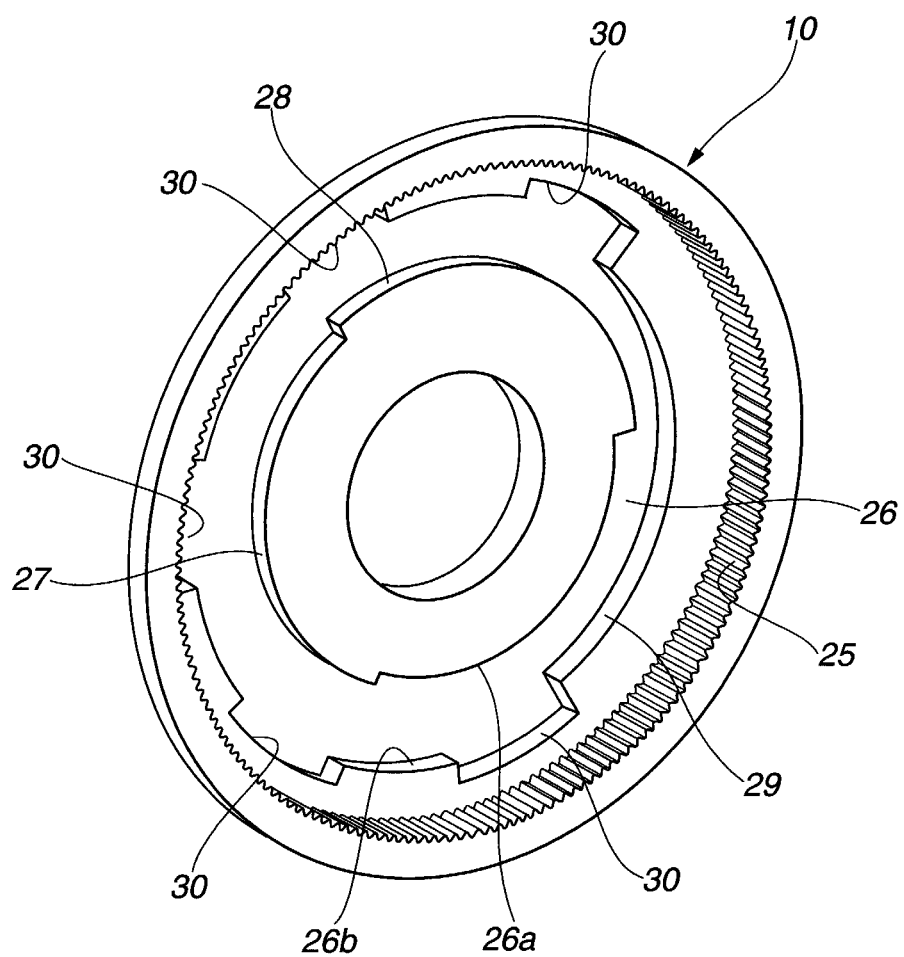
FIG. 7 is a perspective view of a cover plate as shown in FIG. 4, when viewed from an opposite side thereof.
Figure 8:
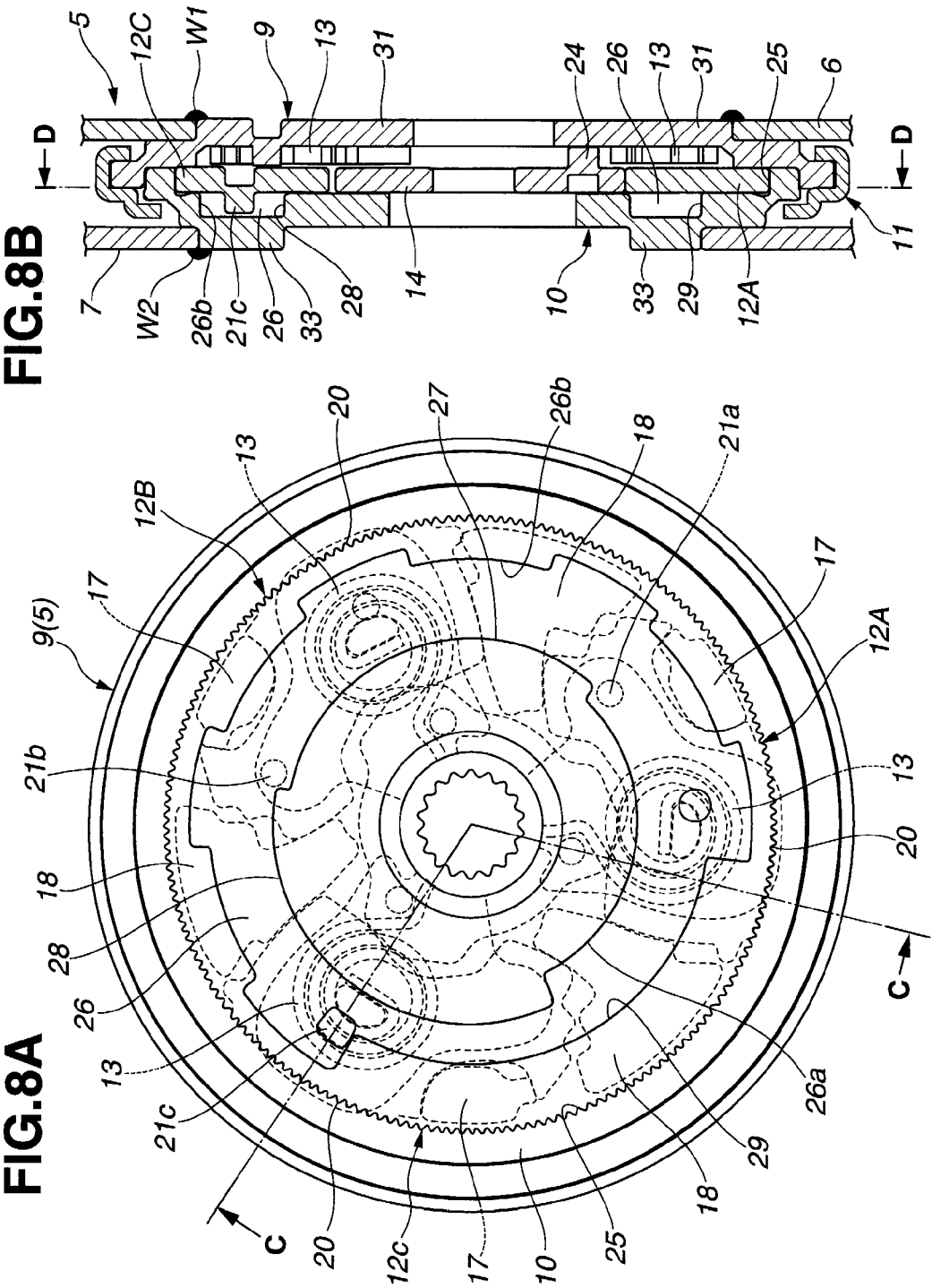
FIG. 8A is a front view of the recliner as shown in FIG. 4, showing a relative position of components.
FIG. 8B is a sectional view, taken along line C-C as shown in FIG. 8A.

The cover plate 10 as shown in FIG. 4 is formed into a circular shallow dish shape by pressing a disk-shaped blank having a uniform thickness in a thickness direction thereof, similarly to the base plate 9. FIG. 7 shows the cover plate 10 when viewed from the side of the base plate 9. As shown in FIG. 7, the cover plate 10 includes an annular bottom wall and a cylindrical side wall connected with the bottom wall. An internal tooth gear 25 is formed over an entire circumference of an inner peripheral surface of the side wall. An annular grooved portion 26 is formed in an inner bottom surface of the bottom wall which faces the base plate 9. The annular grooved portion 26 is recessed from the inner bottom surface toward an opposite side of the base plate 9. The annular grooved portion 26 is disposed on an inner peripheral side of the internal tooth gear 25 in a concentric relation to the internal tooth gear 25.

The annular grooved portion 26 includes an inner peripheral wall surface and an outer peripheral wall surface having a diameter larger than a diameter of the inner peripheral wall surface. The inner peripheral wall surface includes a basic inner peripheral surface 26a, a first guide surface 27 having a diameter larger than a diameter of the basic inner peripheral surface 26a, and a second guide surface 28 having a diameter larger than a diameter of the first guide surface 27. Specifically, the first guide surface 27 projects further than the basic inner peripheral surface 26a in a radially outward direction of the annular grooved portion 26. The second guide surface 28 projects further than the first guide surface 27 in the radially outward direction of the annular grooved portion 26. The basic inner peripheral surface 26a, the first guide surface 27 and the second guide surface 28 are connected with each other in series in a circumferential direction of the annular grooved portion 26 through steps therebetween. That is, the inner peripheral wall surface of the annular grooved portion 26 is divided into the basic inner peripheral surface 26a, the first guide surface 27 and the second guide surface 28.

On the other hand, the outer peripheral wall surface of the annular grooved portion 26 includes a basic outer peripheral surface 26b and a third guide surface 29 having a diameter smaller than a diameter of the basic outer peripheral surface 26b. The third guide surface 29 projects further than the basic outer peripheral surface 26b in a radially inward direction of the annular grooved portion 26. The third guide surface 29 is partially overlapped with the second guide surface 28 in the circumferential direction of the annular grooved portion 26. The basic outer peripheral surface 26b includes a plurality of concave portions (cutout portions) 30 formed at intervals in the circumferential direction of the annular grooved portion 26.

When the base plate 9 and the cover plate 10 are mated with each other, the three tooth plates 12A-12C are arranged such that the external tooth gears 20 of the tooth plates 12A-12C are meshable with the internal tooth gear 25 of the cover plate 10, and the guide projections 21a-21c of the tooth plates 12A-12C are received in the annular grooved portion 26 of the cover plate 10.

FIG. 8A shows the recliner 5 when viewed from the side of the cover plate 10. FIG. 8B is a sectional view taken along line C-C shown in FIG. 8A.

Upon assembling the recliner 5, the spiral springs 13, the tooth plates 12A-12C and the cam 14 are accommodated in the base plate 9, and the cover plate 10 is mated with the base plate 9 in the axial direction. Then, in the mating state, the cover plate 10 is connected with the base plate 9 through the retaining ring 11 subjected to metal forming, for instance, roll forming or curling. Thus, the base plate 9 and the cover plate 10 can be prevented from separating from each other in the axial direction, and can be concentrically and relatively rotatably connected with each other.

In the assembled state as shown in FIGS. 8A and 8B, the cam 14 is urged by the spring force of the spiral springs 13 to press the tooth plates 12A-12C in the radially outward direction. In this state, the external tooth gears 20 of the tooth plates 12A-12C are meshingly engaged with the internal tooth gear 25 of the cover plate 10 to thereby be in a lock state (lock position). That is, each of the spiral springs 13 serve as a biasing member that biases each of the tooth plates 12A-12C in a lock direction in which each of the external tooth gears 20 come into meshing engagement with the internal tooth gear 25.

As described above, the diameter of the second guide surface 28 of the inner peripheral wall surface of the annular grooved portion 26 of the cover plate 10 is larger than the diameter of the first guide surface 27 thereof. Further, the third guide surface 29 of the outer peripheral wall surface of the annular grooved portion 26 has a diameter larger than the diameter of the second guide surface 28. In accordance with such a relationship between the diameters of the first to third guide surfaces 27-29, positions of the first to third guide projections 21a-21c of the tooth plates 12A-12C in a radial direction of the tooth plates 12A-12C are determined. Specifically, as shown in FIG. 6A and FIG. 8A, a distance from a center of the base plate 9 to the second guide projection 21b is larger than a distance from the center of the base plate 9 to the first guide projection 21a, and a distance from the center of the base plate 9 to the third guide projection 21c is larger than the distance from the center of the base plate 9 to the second guide projection 21b.

In the state as shown in FIGS. 8A and 8B, the first to third guide projections 21a-21c are located within the annular grooved portion 26. The first guide projection 21a is located close to an initial end of the first guide surface 27 in the circumferential direction of the annular grooved portion 26 which is connected with the basic inner peripheral surface 26a. The second guide projection 21b is located close to an initial end of the second guide surface 28 in the circumferential direction of the annular grooved portion 26 which is connected with the first guide surface 27. The third guide projection 21c is located close to an initial end of the third guide surface 29 in the circumferential direction of the annular grooved portion 26 which is overlapped with the second guide surface 28 in the circumferential direction of the annular grooved portion 26. With this arrangement of the first to third guide projections 21a-21c, the first to third guide projections 21a-21c are allowed to run upon the corresponding first to third guide surfaces 27-29 and are released therefrom at substantially the same timing.

Further, as seen from FIG. 4 and FIG. 8B, the spring accommodating concave portions 15 are formed by press working in the three positions of the base plate 9, so that bulge portions 31 configured corresponding to the spring accommodating concave portions 15 are formed on a back side of the base plate 9 which is located on an opposite side of the cover plate 10. With the formation of the bulge portions 31, a relatively large step is generated between an outer surface of each of the bulge portions 31 and a general part of the back surface of the base plate 9. The step serves for fitting the bulge portions 31 into an irregular-shaped mount hole 32 of the lower bracket 6 as shown in FIG. 2. In the fitted state, the bulge portions 31 are welded to the lower bracket 6 as indicated at W1 as shown in FIG. 8B, so that the base plate 9 is fixedly connected to the lower bracket 6.

Similarly, as shown in FIG. 7, the annular grooved portion 26 including the third guide surface 29 and the basic outer peripheral surface 26b with the concave portions 30 is formed in the inner bottom surface of the cover plate 10 by press working. Accordingly, as shown in FIG. 8B, a generally annular bulge portion 33 having an outer peripheral surface configured corresponding to the outer peripheral wall surface of the annular grooved portion 26 is formed on a back side (an outer bottom surface) of the cover plate 10 which is located on an opposite side of the base plate 9. That is, the outer peripheral surface of the bulge portion 33 includes concave and convex portions corresponding to the third guide surface 29 and the basic outer peripheral surface 26b with the concave portions 30 of the outer peripheral wall surface of the annular grooved portion 26. With the formation of the bulge portion 33, a relatively large step is generated between an outer surface of the bulge portion 33 and a general part of the back surface (the outer bottom surface) of the cover plate 10. The step serves for fitting the bulge portion 33 into an irregular-shaped mount hole 34 of the upper bracket 7 as shown in FIG. 3. In the fitted state, the bulge portion 33 is welded to the upper bracket 7 as indicated at W2 as shown in FIG. 8B, so that the cover plate 10 is fixedly connected to the upper bracket 7.

With the above connecting construction, it is not necessary to provide a step for connecting the base plate 9 and the lower bracket 6 and a step for connecting the cover plate 10 and the upper bracket 7, respectively. In addition, it is advantageous to prevent relative rotation of the recliner 5 and each of the lower and upper brackets 6, 7.

Further, the connection between the recliner 5 and each of the lower and upper brackets 6, 7 is not particularly limited to the above embodiment. The base plate 9 of the recliner 5 may be connected to the upper bracket 7, and the cover plate 10 of the recliner 5 may be connected to the lower bracket 6.

Figure 9:
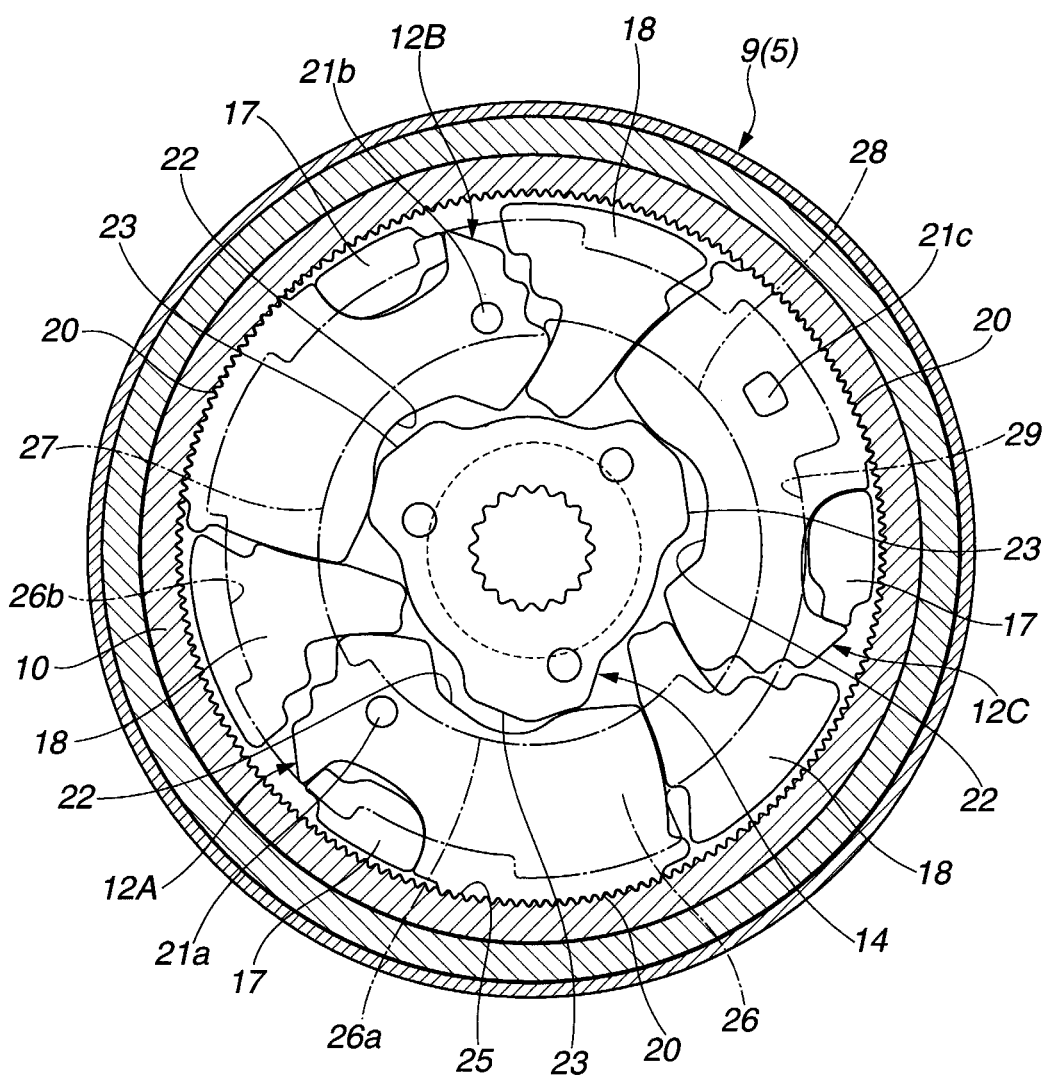
FIG. 9 is an explanatory diagram showing an operation of the recliner when a seat back of the vehicle seat is located in a neutral position P1 shown in FIG. 1.
Figure 10:
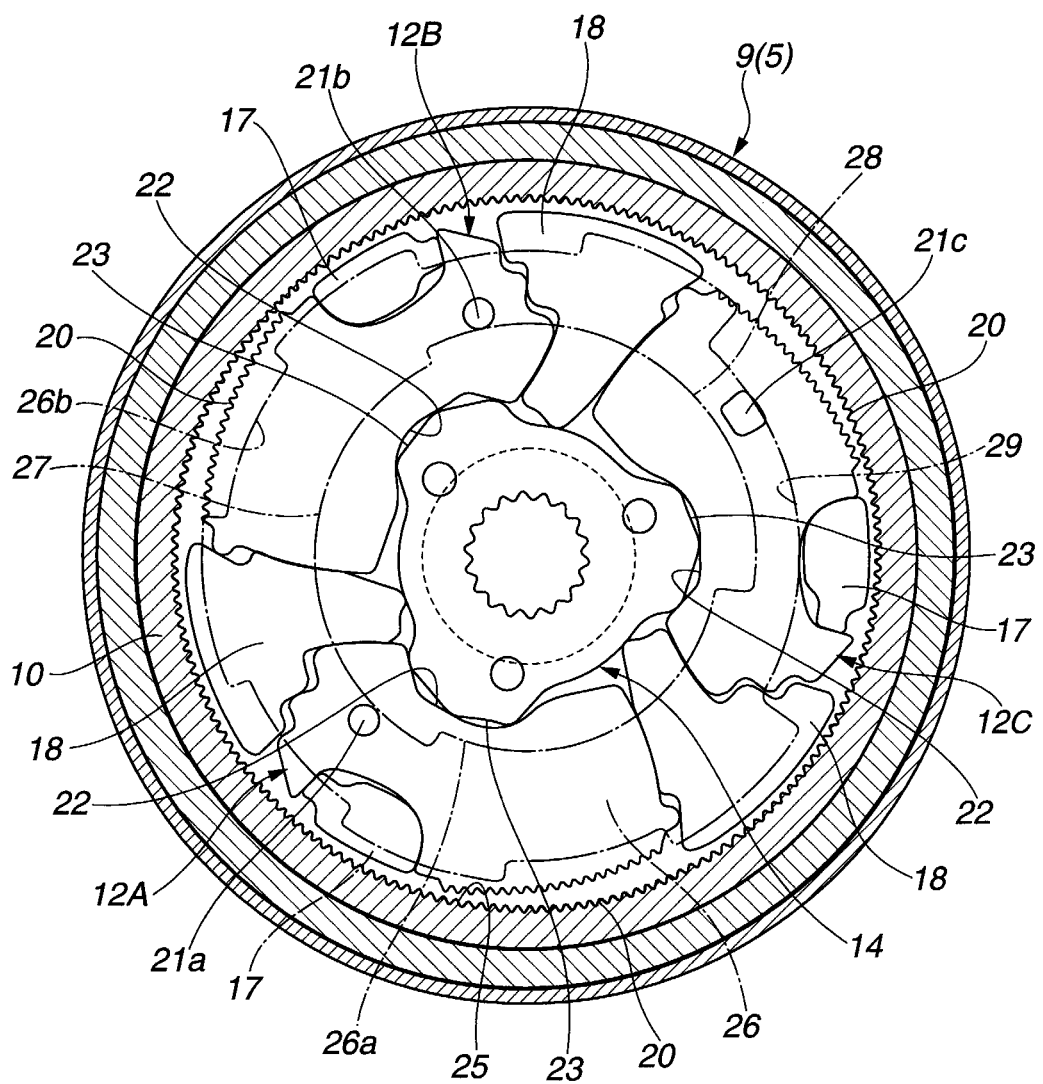
FIG. 10 is an explanatory diagram showing an operation of the recliner when the seat back is located in an optional position P5 in a free range R2 shown in FIG. 1.
Figure 11:
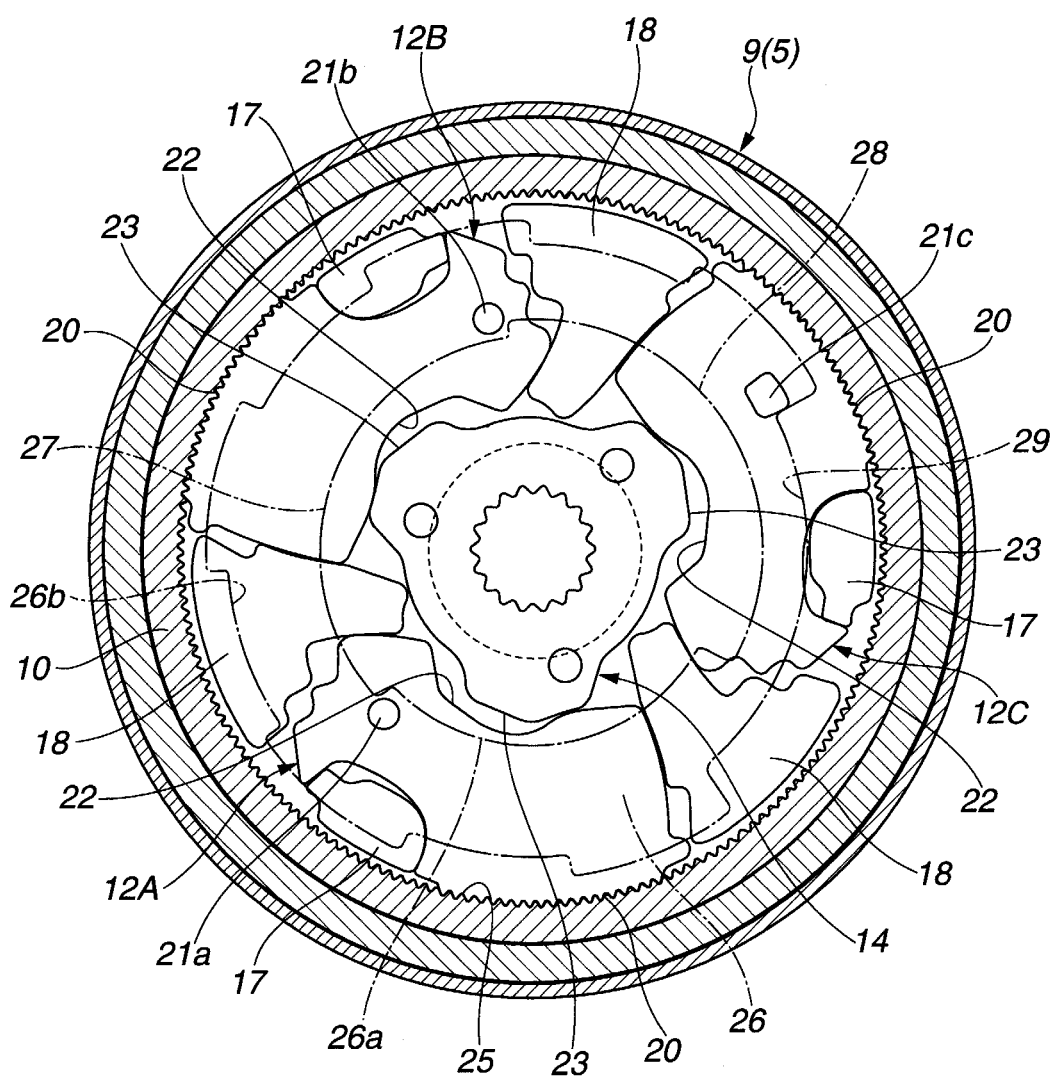
FIG. 11 is an explanatory diagram showing an operation of the recliner when the seat back is located in an initial stage lock position P2 shown in FIG. 1.

Next, an operation of the thus-constructed recliner 5 is explained by referring to FIG. 9 to FIG. 11. FIG. 9 to FIG. 11 are sectional views taken along line D-D shown in FIG. 8B. FIG. 9 to FIG. 11 are diagrams when viewed in a direction from the side of the base plate 9 toward the cover plate 10 in order to focus movement of the recliner 5. In contrast, FIG. 4 to FIG. 8 are diagrams when viewed in a direction from the side of the cover plate 10 toward the base plate 9 in order to facilitate understanding of the internal construction of the recliner 5.

FIG. 9 shows a condition of the recliner 5 corresponding to the neutral position P1 of the seat back 4 as shown in FIG. 1. In the condition shown in FIG. 9, the base plate 9 fixed to the lower bracket 6 (see FIGS. 1-3) serves as a fixed side member, and the cover plate 10 fixed to the upper bracket 7 (see FIGS. 1-3) serves as a moveable side member. The drive-side cam surface 23 on each of the peaks of the cam 14 is in contact with a portion of the driven-side cam surface 22 of each of the tooth plates 12A-12C which is located in an advanced position relative to the support projection 17 as the fulcrum of the pivotal movement of each of the tooth plates 12A-12C so as to be spaced away therefrom in the counterclockwise direction in FIG. 9. Further, in this condition, the first to third guide projections 21a-21c of the tooth plates 12A-12C are located within the annular grooved portion 26 of the cover plate 10, but do not run upon the corresponding first to third guide surfaces 27-29 of the annular grooved portion 26. The first, second and third guide projections 21a, 21b and 21c are located to be overlapped with the basic inner peripheral surface 26a, the first guide surface 27 and the basic outer peripheral surface 26b, respectively, in the circumferential direction of the annular grooved portion 26, and are opposed thereto in the radial direction of the annular grooved portion 26, respectively, with clearances.

Accordingly, each of the tooth plates 12A-12C is urged to pivotally move about the support projection 17 as the fulcrum in the radially outward direction of the base plate 9 by the cam 14, so that the external tooth gear 20 of each of the tooth plates 12A-12C can be brought into meshing engagement with the internal tooth gear 25 of the cover plate 10 and thus the tooth plates 12A-12C are in a lock state (lock position). Therefore, the cover plate 10 formed with the internal tooth gear 25 is restrained at the position shown in FIG. 9, that is, the cover plate 10 is in a substantially lock state. As a result, the seat back 4 is locked in the neutral position P1 shown in FIG. 1.

In the condition shown in FIG. 9, when the operating lever 8 shown in FIG. 1 is lifted up in the clockwise direction, the cam 14 integrally connected with the operating lever 8 is pivotally moved in the clockwise direction in FIG. 9. As the cam 14 is pivotally moved, the drive-side cam surface 23 comes into contact with a portion of the driven-side cam surface 22 of each of the tooth plates 12A-12C which is located in an advanced position relative to the support projection 17 in the clockwise direction in FIG. 9. Therefore, each of the tooth plates 12A-12C is pivotally moved about the support projection 17 and displaced in the radially inward direction of the base plate 9, so that the external tooth gear 20 of each of the tooth plates 12A-12C is disengaged from the internal tooth gear 25 of the cover plate 10 and thus the tooth plates 12A-12C are in an unlock state (unlock position). As a result, the seat back 4 is brought into an unlock state.

When the seat back 4 is forward or rearward inclined while keeping the tooth plates 12A-12C in the unlock state (i.e., while keeping the operating lever 8 in the lift-up state), the position (attitude) of the seat back 4 can be changed to an optional position within the reclining range R1 between the initial stage lock position P2 and the rearwardmost inclining position P3 as shown in FIG. 1. Then, when the operating lever 8 is released from the lift-up state, the seat back 4 can instantaneously return to the lock state in the optional position. Further, in the unlock state as described above, if necessary, the seat back 4 can be forward inclined within the free range R2 until the forwardmost inclining position P4 as a limit of the free range R2.

FIG. 10 shows a condition of the recliner 5 corresponding to an optional position P5 of the seat back 4 within the free range R2 shown in FIG. 1.

As described above, when the tooth plates 12A-12C placed in the lock state (lock position) shown in FIG. 9 which corresponds to the neutral position P1 shown in FIG. 1 are brought into the unlock state (unlock position) by lifting up the operating lever 8, the external tooth gear 20 of each of the tooth plates 12A-12C is disengaged from the internal tooth gear 25 of the cover plate 10. In this condition, when the seat back 4 is forward inclined while keeping the tooth plates 12A-12C in the unlock state, the position of the seat back 4 can be changed within the free range R2 including the optional position P5 as shown in FIG. 1.

Specifically, when the tooth plates 12A-12C placed in the lock state shown in FIG. 9 is moved to the unlock state and then the seat back 4 is forward inclined while keeping the tooth plates 12A-12C in the unlock state, the cover plate 10 is allowed to rotate together with the seat back 4 in the counterclockwise direction in FIG. 9. Since the first to third guide surfaces 27-29 are formed so as to be shared by the inner and outer peripheral wall surfaces of the annular grooved portion 26 of the cover plate 10, as shown in FIG. 10, the first guide projection 21a of the tooth plate 12A, the second guide projection 21b of the tooth plate 12B and the third guide projection 21c of the tooth plate 12C are allowed to run upon the first guide surface, the second guide surface 28 and the third guide surface 29, respectively. In such a condition that the first, second and third guide projections 21a, 21b and 21c are allowed to run upon the first, second and third guide surfaces 27, 28 and 29, respectively, even when the operating lever 8 is released, the tooth plates 12A-12C can be held in the unlock state in which the external tooth gear 20 of each of the tooth plates 12A-12C is disengaged from the internal tooth gear 25 of the cover plate 10. This unlock state can be kept even when the seat back 4 is in any position within the free range R2 shown in FIG. 1.

Further, since the seat back 4 is always forward inclinably biased by the spring member (not shown) as described above, the seat back 4 can be forward inclined until the forwardmost inclining position P4 by releasing a restraining force applied to the seat back 4 while being kept within the free range R2. Thus, the seat back 4 can be held in a state overlapped with the seat cushion 3. In this embodiment, even in such a state that the seat back 4 is in the forwardmost inclining position P4, the first, second and third guide projections 21a, 21b and 21c of the tooth plates 12A-12C are held in the state running upon the first, second and third guide surfaces 27, 28 and 29 of the annular grooved portion 26 of the cover plate 10, respectively.

FIG. 11 shows a condition of the recliner 5 corresponding to the initial stage lock position P2 of the seat back 4 as shown in FIG. 1. When the seat back 4 is rearward inclined to pivotally move from the optional position P5 within the free range R2 of FIG. 1, the condition of the recliner 5 as shown in FIG. 10 is changed to the condition thereof as shown in FIG. 11. In the condition shown in FIG. 10, when the seat back 4 is rearward inclined, the cover plate 10 is allowed to rotate in the clockwise direction in FIG. 10. Therefore, relative rotation of the first to three guide projections 21a-21c of the tooth plates 12A-12C and the corresponding first to third guide surfaces 27-29 of the annular grooved portion 26 of the cover plate 10 is caused while keeping the unlock state (unlock position) of the tooth plates 12A-12C in which the first to three guide projections 21a-21c are in the state running upon the corresponding first to third guide surfaces 27-29.

Subsequently, as shown in FIG. 11, at the moment at which the first to three guide projections 21a-21c are moved out of the corresponding first to third guide surfaces 27-29, the cam 14 is pivotally moved in the counterclockwise direction in FIG. 11 by the spring force of the three spiral springs 13. The tooth plates 12A-12C are allowed to pivotally move in the radially outward direction of the base plate 9. The external tooth gear 20 of each of the tooth plates 12A-12C comes into meshing engagement with the internal tooth gear 25 of the cover plate 10, so that the tooth plates 12A-12C are in the lock state (lock position). As a result, the seat back 4 can be self-locked in the initial stage lock position P2 shown in FIG. 1. Further, when the tooth plates 12A-12C locked as shown in FIG. 11 are brought into the unlock state by lifting up the operating lever 8, the seat back 4 can be rearward inclined until an optional position within the reclining range R1 shown in FIG. 1.

As explained above, in the seat reclining apparatus according to the embodiment of the present invention, the annular grooved portion 26 is formed in the surface of the cover plate 10 which faces the base plate 9, and the first and second guide surfaces 27, 28 are formed on the inner peripheral wall surface of the annular grooved portion 26, and the third guide surface 29 is formed on the outer peripheral wall surface of the annular grooved portion 26. Thus, the first to third guide surfaces 27-29 are shared by the inner and outer peripheral wall surfaces of the annular grooved portion 26. Specifically, the guide projections 21a, 21b which correspond to the first and second guide surfaces 27, 28, respectively, are formed on an opposite side of the respective external tooth gears 20 with respect to the support projections 17 as the fulcrums of the pivotal movement of the tooth plates 12A, 12B, in the circumferential direction of the base plate 9. With this construction, the inner peripheral wall surface of the annular grooved portion 26 can be used as the guide surface for restraining the meshing engagement between the respective external tooth gears 20 of the tooth plates 12A, 12B and the internal tooth gear 25 of the cover plate 10.

Accordingly, the first to third guide surfaces 27-29 are located in alignment with each other in the axial direction of the recliner 5 without being offset from each other as disclosed in the seat reclining apparatus of the above conventional art.

With the axially aligned arrangement of the first to third guide surfaces 27-29, the recliner 5 can perform its function without increasing a thickness of the cover plate 10 and a thickness of the recliner 5. As a result, the recliner 5 can be slimmed down with a reduced thickness and weight.

In addition, as explained by referring to FIGS. 2 and 3, the bulge portions 31 on the back side of the base plate 9 are fitted into the irregular-shaped mount hole 32 of the lower bracket 6, and are welded to the lower bracket 6. Further, the bulge portion 33 on the back side of the cover plate 10 is fitted into the irregular-shaped mount hole 34 of the upper bracket 7, and is welded to the upper bracket 7. With this connecting construction, it is not necessary to provide a step for connecting the base plate 9 and the lower bracket 6 and a step for connecting the cover plate 10 and the upper bracket 7, respectively. As a result, the recliner 5 can be reduced in thickness and size. In addition, it is advantageous to prevent relative rotation of the recliner 5 and each of the lower and upper brackets 6, 7. Further, it is possible to serve for enhancing a rigidity of a seat cushion frame (not shown) or a seat back frame (not shown) to which the lower bracket or the upper bracket is mounted.

In the above-described embodiment, the first and second guide surfaces 27, 28 are formed on the inner peripheral wall surface of the annular grooved portion 26, and the third guide surface 29 is formed on the outer peripheral wall surface of the annular grooved portion 26. However, the present invention is not particularly limited to the embodiment. One or two of the first to third guide surfaces 27-29 may be formed on the inner peripheral wall surface of the annular grooved portion 26, and the remainder thereof may be formed on the outer peripheral wall surface of the annular grooved portion 26.

Furthermore, as shown in FIG. 9, each of the first and second guide projections 21a, 21b is formed on the opposite side of each of the external tooth gears 20 of the corresponding tooth plates 12A, 12B in the circumferential direction of the tooth plates 12A, 12B with respect to the support projection 17 of the base plate 9 which serves as a fulcrum of the pivotal movement of the tooth plates 12A, 12B. That is, the support projection 17 is disposed between each of the first and second guide projections 21a, 21b and each of the external tooth gears 20 of the corresponding tooth plates 12A, 12B in the circumferential direction of the tooth plates 12A, 12B. Further, only the third guide projection 21c is formed on the side of the external tooth gear 20 of the corresponding tooth plate 12C with respect to the support projection 17 as a fulcrum of the pivotal movement of the tooth plate 12C. However, positions of the first to third guide projections 21a-21c are not particularly limited to the embodiment, and can be changed as long as an essential movement of each of the tooth plates 12A-12C is ensured.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

The invention claimed is:

1. A seat reclining apparatus for a vehicle seat, the vehicle seat including a seat cushion and a seat back, the seat reclining apparatus comprising:
a base member fixed to one of a lower bracket on a side of the seat cushion and an upper bracket on a side of the seat back;
a cover member fixed to the other of the lower bracket and the upper bracket, the cover member being overlapped with the base member and rotatable relative to the base member;
an internal tooth gear formed in an inner periphery of the cover member;
three tooth plates disposed between the base member and the cover member along a circumferential direction of the base member and the cover member, the three tooth plates having external tooth gears which are displaceable in a radial direction of the internal tooth gear and meshable with the internal tooth gear, respectively;
a cam member pivotably disposed on an inner peripheral side of the three tooth plates, the cam member serving to displace the three tooth plates between a lock position in which the internal tooth gear and the external tooth gears are meshingly engaged with each other and an unlock position in which the internal tooth gear and the external tooth gears are disengaged from each other;
a biasing member biasing each of the three tooth plates in a lock direction in which the internal tooth gear and the external tooth gears come into meshing engagement;
three guide projections formed on the three tooth plates, respectively, the three guide projections projecting toward the cover member;
an annular grooved portion formed in a surface of the cover member which faces the base member in a concentric relation to the internal tooth gear, the annular grooved portion being recessed in an axial direction of the cover member; and
three guide surfaces formed on the annular grooved portion corresponding to the respective three guide projections that project into the annular grooved portion, one or two of the three guide surfaces being formed on an inner peripheral wall surface of the annular grooved portion, the remainder of the three guide surfaces being formed on the outer peripheral wall surface of the annular grooved portion, wherein the three guide surfaces serve to restrain displacement of the three tooth plates toward the lock position when the respective three guide projections are allowed to run upon the corresponding guide surfaces.

2. The seat reclining apparatus for a vehicular seat as claimed in claim 1, wherein the three guide surfaces are a first guide surface formed on the inner peripheral wall surface of the annular grooved portion, a second guide surface formed on the inner peripheral wall surface of the annular grooved portion, and a third guide surface formed on the outer peripheral wall surface of the annular grooved portion, the first and second guide surfaces projecting in a radially outward direction of the annular grooved portion, the third guide surface projecting in a radially inward direction of the annular grooved portion, and
wherein the inner peripheral wall surface of the annular grooved portion further comprises a basic inner peripheral surface, the first guide surface having an arcuate shape having a diameter larger than that of the basic inner peripheral surface, the second guide surface having an arcuate shape having a diameter larger than that of the first guide surface, the first guide surface and the second guide surface being connected with each other in series in the circumferential direction of the annular grooved portion.

3. The seat reclining apparatus for a vehicular seat as claimed in claim 2, wherein the outer peripheral wall surface of the annular grooved portion further comprises a basic outer peripheral surface, the basic outer peripheral surface comprising a plurality of concave portions formed at intervals in the circumferential direction of the annular grooved portion,
wherein the cover member comprises a bulged portion formed on a side of the cover member which is located an opposite side of the base member, the bulged portion having an outer peripheral surface with concave and convex portions corresponding to the third guide surface and basic outer peripheral surface with the plurality of concave portions of the annular grooved portion,
wherein the bulged portion is fitted to a mount hole formed in the lower bracket or the upper bracket.

4. The seat reclining apparatus for a vehicular seat as claimed in claim 1, wherein the three tooth plates are pivotally moveable about three support projections that project from the base member toward the cover member, respectively.

5. The seat reclining apparatus for a vehicular seat as claimed in claim 2, wherein the three guide projections are a first guide projection, a second guide projection having a distance from a center of the base member which is larger than a distance from the center of the base member to the first guide projection, and a third guide projection having a distance from the center of the base member which is larger than the distance from the center of the base member to the second guide projection.

\* \* \* \* \*